United States Patent [19]

Münster

[11] 4,261,963
[45] Apr. 14, 1981

[54] PROCESS FOR THE MANUFACTURE OF AMMONIUM SULFAMATE

[75] Inventor: Gerhard Münster, Bad Soden am Taunus, Fed. Rep. of Germany

[73] Assignee: Hoechst Aktiengesellschaft, Frankfurt am Main, Fed. Rep. of Germany

[21] Appl. No.: 96,547

[22] Filed: Nov. 21, 1979

[30] Foreign Application Priority Data

Nov. 24, 1978 [DE] Fed. Rep. of Germany ....... 2850903

[51] Int. Cl.³ .................. C01B 21/093; C01B 21/086
[52] U.S. Cl. ........................................... 423/388
[58] Field of Search ..................... 423/387, 388, 389

[56] References Cited

U.S. PATENT DOCUMENTS 3,661,516   5/1972   Hofmeister ........................ 423/388
4,133,870   1/1979   Gräser ............................... 423/388

*Primary Examiner*—G. O. Peters
*Attorney, Agent, or Firm*—Curtis, Morris & Safford

[57] ABSTRACT

A process for the manufacture of ammonium sulfamate by introducing under pressure ammonia and sulfur trioxide into a reactor containing a melt which mainly consists of ammonium sulfamate and ammonium imidodisulfonate, while maintaining a molar ratio of $NH_3/SO_3$ of from 1.5 to 1 to 2.0:1, which comprises introducing sulfur trioxide into the gas phase above the melt.

10 Claims, No Drawings

PROCESS FOR THE MANUFACTURE OF AMMONIUM SULFAMATE

The present invention relates to a process for the manufacture of ammonium sulfamate from ammonia and sulfur trioxide under pessure.

German Offenlegungsschriften No. 19 15 723 and 27 10 399 disclose processes, wherein the reaction product of ammonia and sulfur trioxide is obtained in a molten state. In the process disclosed in German Offenlegungsschrift No. 19 15 723 there is used an excess of ammonia, preferably up to two to four times the stoichiometrical quantity. The process disclosed in German Offenlegungsschrift No. 27 10 399 uses less than the stoichiometrical amount of ammonia and the gases accumulating above the melt are not removed from the reactor.

The process of German Offenlegungsschrift No. 19 15 723 has the disadvantage that the excess ammonia must be withdrawn from the reactor continuously, thus carrying along solid particles which rapidly obstruct fittings and conduits. In the process of German Offenlegungsschrift No. 27 10 399 inert gases, such as nitrogen, which may be obtained by thermal decomposition of ammonium sulfamate, accumulate gradually in the gaseous phase over the melt so that the ammonia partial pressure decreases and the total pressure has to be increased continuously.

It was, consequently, the objective to provide a process for the manufacture of ammonium sulfamate in which the disadvantages of the said processes do not occur.

Subject of the present invention therefore is a process for the manufacture of ammonium sulfamate by introducing under pressure ammonia and sulfur trioxide into a receptacle containing a melt which mainly consists of or contains ammonium sulfamate and ammonium imidodisulfonate, while maintaining a molar ratio of $NH_3/SO_3$ of from 1.5:1 to 2.0:1, which comprises introducing sulfur trioxide into the gaseous phase above the melt. The inert gases gradually accumulating in the gaseous phase may be removed by occasional pressure release of the pressure reactor.

German Offenlegungsschrift No. 19 15 723, certainly, teaches to introduce $SO_3$ into the gas phase and $NH_3$ into the melt in the reactor. However, it could not have been foreseen that this measure would also be advantageous in the absence of an excess of ammonia.

The process of the invention is carried out at an ammonia pressure substantially corresponding to the total pressure, that is, at a pressure of from 2 to 30, preferably 5 to 15, bars. Pressures above 30 bars are uneconomic for technical reasons and at a pressure of less than 2 bars the proportion of ammonium imidodisulfonate in the melt greatly increases at the expense of ammonium sulfamate.

The sulfur trioxide has to be introduced into the gas phase above the melt either in a gaseous state or preferably in liquid state. Generally the melt is the reaction product as well. By the introduction of the sulfur trioxide into the melt (cf., for example, the process according to German Offenlegungsschrift No. 27 10 399) there are obtained higher proportions of ammonium imidodisulfonate which is converted very slowly only to ammonium sulfamate by ammonia. With an increasing quantity of ammonium imidodisulfonate in the melt, the melting point increases so that it may occur that the contents of the reactor completely solidify. Simultaneously decomposition and secondary reactions occur in a pronounced manner owing to unsatisfactory heat dissipation.

The place of introduction of ammonia is not critical. Ammonia may be introduced into the melt or into the gaseous phase or simultaneously into both phases, either in gaseous or in liquid state.

The weight ratio at which ammonia and sulfur trioxide react with one another corresponds at most to the stoichiometrical ratio of 2:1, this being the ratio in which both components are combined in the main reaction product, which is ammonium sulfamate. In order to maintain the molar ratio of $NH_3/SO_3$ of from 1.5:1 to 2.0:1 it is sufficient to feed ammonia to the reactor at a rate corresponding to amounts which would be consumed by the reaction at a given $SO_3$ dosage rate and at approximately constant pressure. Part of the ammonia is dissolved in the melt and escapes when the melt is withdrawn and released from pressure until normal pressure is reached. When occasionally releasing the pressure in the reactor to remove the inert gases, losses of ammonia are encountered.

The process according to the invention is run at a melting temperature of from 120° to 250° C., preferably 180° to 220° C. However, in the real reaction zone in the gaseous phase, temperatures of up to 300° C. are to be found. Nevertheless decomposition and the formation of secondary products such as sulfate are surprisingly low at these temperatures. The reaction heat can be dissipated in known manner, by jacket cooling, cooling coils or heat exchangers.

A particular embodiment of the process of the invention consists in using an apparatus made from stainless steel instead of expensive pressure reactors made from enamelled steel, titanium or Hastelloy ® C. The use of stainless steel reactors is possible because of the relatively low wall temperature at the zones that are in contact with the melt and also by the addition of small quantities of nitric acid or of an inorganic nitrate, preferably ammonium nitrate, as corrosion inhibitor. The additive amounts are in the range of from about 0.01 to 2 weight %, based on the weight of the melt. A colorless melt is produced which is nearly white on solidification and has a very low content of heavy metals.

The process of the invention is run preferably in continuous manner, by feeding the reaction components ammonia and sulfur trioxide and optionally ammonium nitrate as corrosion inhibitor to a pressure reactor, which is, for example, provided with a stirrer, and by withdrawing the melt from the lower portion of the reactor. The reaction heat can alternatively be dissipated from the reactor using heat exchangers through which the melt circulates. Accumulating inert gases, if any, are discarded, if desired, by partial pressure release.

The reaction product contains of from about 70 to 90 weight % of ammonium sulfamate in addition to ammonium imidodisulfonate, ammonium sulfate and some free ammonia. It can be used directly as herbicide or for the manufacture of amidosulfonic acid.

The following examples illustrate the invention:

EXAMPLE 1

To a 1 liter autoclave with stirrer, which was made from stainless steel (German type No. 1.4571) and provided with a heating or cooling jacket, a bottom valve, inlets for ammonia and sulfur trioxide and a stopcock for the pressure release of the gaseous zone, there were fed 1157 g of a melt of 79 weight % of ammonium sulfamate, 13 weight % of ammonium imidodisulfonate and 8 weight % of ammonium sulfate, and 6 g of ammonium nitrate. The contents were heated to 200° C. using a thermostat with oil circulation. Then ammonia was introduced under pressure from a steel bottle through a tube immersing into the melt. With the valve of the ammonia steel bottle being completely open, a pressure of from 6 to 7 bars was established above the melt. Liquid sulfur trioxide was metered in through a diaphragm pump into the gas phase above the melt, which was stirred at a speed of 200 rpm, at a rate of 70 ml/h. The temperature of the melt rose to 220° C. At half hour intervals about 100 to 150 g portions of the melt were withdrawn through the bottom valve and conveyed into a stainless steel trough where they were left for solidification. After 4 hours the $SO_3$ dosage rate was increased to 80 ml/h and after a further 30 minutes to 110 ml/h. The increased $SO_3$ dosage rates caused a temporary temperature increase to 280° C. so that the temperature of the oil circulation thermostat could be lowered to 180° C. 4 Hours after the test began the gas pressure in the reactor was reduced to 3 bars to remove the inert gases by briefly opening the stopcock. Subsequently, the pressure rose immediately up to the initial level of 6 to 7 bars. After a period of 5 hours and 45 minutes a total of 454 ml of $SO_3$ had been metered in and 1194 g of melt had been withdrawn. The remaining quantity of melt in the reactor amounted to 1180 g. This product had the following composition: 76 weight % of ammonium sulfamate, 14 weight % of ammonium imidodisulfonate and 10 weight % of ammonium sulfate.

COMPARATIVE EXAMPLE (INTRODUCTION OF $SO_3$ INTO THE MELT)

An apparatus analogous to that in Example 1 was charged with 1,200 g of a melt consisting of pure ammonium sulfamate and with 6 g of ammonium nitrate and the contents were heated to 200° C. Then ammonia from a steel bottle was introduced into the melt under pressure whereby a pressure of 7 to 8 bars was established in the gas phase. Thereafter 80 ml/h of liquid $SO_3$ were metered into the stirred melt through an immersed tube. A temperature increase of the melt was not observed during this addition. After 1 hour attempts were made to withdraw a sample through the bottom valve, however, no product ran out. Therefore the temperature of the jacket was raised to 220° C. and within a further hour a further 80 ml of liquid $SO_3$ were metered in. Even 2 hours later, no product ran out. No additional $SO_3$ was metered in and the contents of the autoclave were kept, while stirring, for 3 hours under a pressure of from 7 to 8 bars with the ammonia valve open and at a temperature of 220° C. in order to ammonolyze and liquify the product which was supposed to have solidified. This measure was also unsuccessful. Thereafter the pressure in the autoclave was released and the cover was screwed off. A pasty mass which was no longer capable of flowing even at 220° C. was found in the autoclave. This product had the following composition: 12 weight % of ammonium sulfamate, 59 weight % of ammonium imidodisulfonate, 20 weight % of ammonium sulfate and 10 weight % of free sulfuric acid (which probably was present as ammonium hydrogenosulfate).

The introduction of $SO_3$ into the melt apparently brought about a local overheating at the inlet, accompanied by the formation of decomposition products such as sulfate and inert gases, which prevented the entry of further quantities of ammonia.

It was proved by feeding the ground product to the autoclave and treating it with ammonia for 4 hours at 200° C. under 6 to 7 bars that the reaction product of the Comparative Example could be ammonolyzed if sufficient ammonia were present. After this period of time the product could be withdrawn through the bottom valve in liquid state. The ammonolyzed product had the following composition: 64 weight % of ammonium sulfamate, 12 weight % of ammonium imidodisulfonate and 23 weight % of ammonium sulfate.

EXAMPLE 2

An apparatus analogous to that of Example 1 was charged with 1158 g of a melt consisting of 76 weight % of ammonium sulfamate, 14 weight % of ammonium imidodisulfonate and 10 weight % of ammonium sulfate (final product of Example 1) and with 12 g of ammonium nitrate and the contents were heated to 200° C. Ammonia was introduced from a steel bottle to establish a pressure of 5.8 to 6.2 bars above the melt. Then 130 ml/h of liquid $SO_3$ were metered in into the gaseous zone. The temperature of the jacket was found to be 180° C. and that of the melt was found to be 200° C. At one hour intervals 300 to 500 g portions of the melt were withdrawn through the bottom valve. After 1 hour, the $SO_3$ dosage rate was increased to 150 ml/h and after a further hour it was increased to 170 ml/h. During this addition the temperature of the jacket was lowered to 175° C. and the temperature of the melt rose to 220°–230° C. After a period of 4 hours and 15 minutes, 665 ml of $SO_3$ had been metered in and 1585 g of melt had been withdrawn. The quantity of melt remaining in the reactor was 1048 g. This melt had the following composition: 71 weight % of ammonium sulfamate, 21 weight % of ammonium imidodisulfonate and 7 weight % of ammonium sulfate.

EXAMPLE 3

An apparatus analogous to that of Example 1 was charged with 1065 g of pure ammonium sulfamate and with 12 g of ammonium nitrate and the contents were heated to 200° C. Liquid ammonia was introduced into the melt from a steel bottle turned over with the valve directed downwards. A pressure of 6 to 7 bars was established in the closed autoclave over the melt. A safety valve prevented of the melt from flowing back into the ammonia inlet tube. Then 140 ml/h of liquid $SO_3$ were metered in into the gaseous zone. The temperature of the melt was found to be approximately 200° C. and that of the jacket was found to be 185° C. The cooling effect of using liquid ammonia which partially evaporated in the inlet tube, could be distinctly observed. Therefore the $SO_3$ addition rate was increased to 160 ml/h after 2 hours and to 200 ml/h after a further 30 minutes with the temperature of the melt rising to 225° C. and that of the jacket being 168° C. Per hour about 300 to 600 g portions of the melt were withdrawn. After 3 hours a total of 559 ml of $SO_3$ had been metered in and 1209 g of melt had been withdrawn. The quantity of melt remaining in the reactor was 1120 g. The melt had the following composition: 68 weight % of ammonium sulfamate, 23 weight % of ammonium imidodisulfonate and 7 weight % of ammonium sulfate.

What is claimed is:

1. In a process for the manufacture of ammonium sulfamate by introducing under pressure ammonia and sulfur trioxide into a reactor containing a melt which contains mainly ammonium sulfamate and ammonium imidodisulfonate, the molar ratio of $NH_3/SO_3$ being maintained in a range of from 1.5:1 to 2.0:1, the improvement comprising introducing the sulfur trioxide into a gas phase above the melt and adding an amount of from 0.01 to 2 weight % of nitric acid or an inorganic nitrate to the melt.

2. The process as claimed in claim 1, which comprises feeding the ammonia into the reactor at a rate corresponding to the amount consumed.

3. The process as claimed in claim 1, which comprises carrying out the reaction under an ammonia pressure of from 2 to 30 bars.

4. The process as claimed in any one of claims 1 to 3, wherein the temperature of the melt is in the range of from 120° to 250° C.

5. The process as claimed in claim 4, which comprises carrying out the reaction in an apparatus made from stainless steel.

6. The process as claimed in claim 5, which comprises carrying out the reaction in the presence of from 0.01 to 2 weight % of ammonium nitrate in the melt.

7. The process as claimed in claim 3, wherein the pressure is from 5 to 15 bars.

8. The process as claimed in claim 1, wherein the $SO_3$ is introduced as a liquid.

9. The process as claimed in claim 1, further including the step of removing the inert gases which accumulate at the gas phase by releasing the pressure within the reactor.

10. In a process for the manufacture of ammonium sulfamate by introducing under pressure ammonia and sulfur trioxide into a reactor containing a melt which contains mainly ammonium sulfamate and ammonium imidodisulfonate, the molar ratio of $NH_3/SO_3$ being maintained in a range of from 1.5:1 to 2.0:1, the improvement comprising introducing the sulfur trioxide into a gas phase above the melt and adding an amount of from 0.01 to 2 weight % of ammonium nitrate to the melt.

* * * * *